Dec. 23, 1952 J. HAUK 2,622,309
DEVICE FOR FILING THE SLOTS OF LAMINATED CORES
Filed May 21, 1948 4 Sheets-Sheet 1
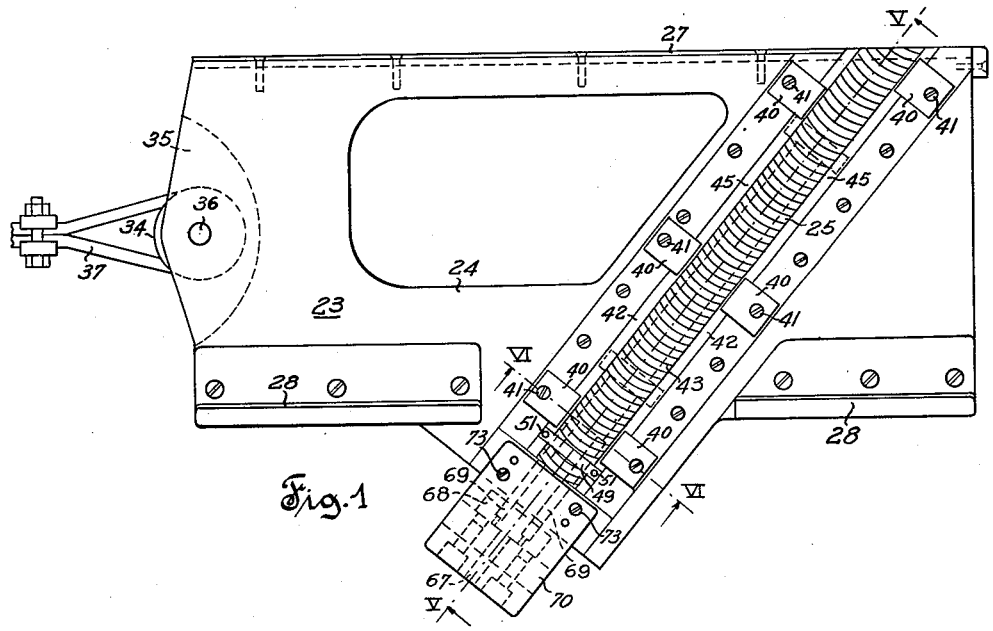
Fig. 1
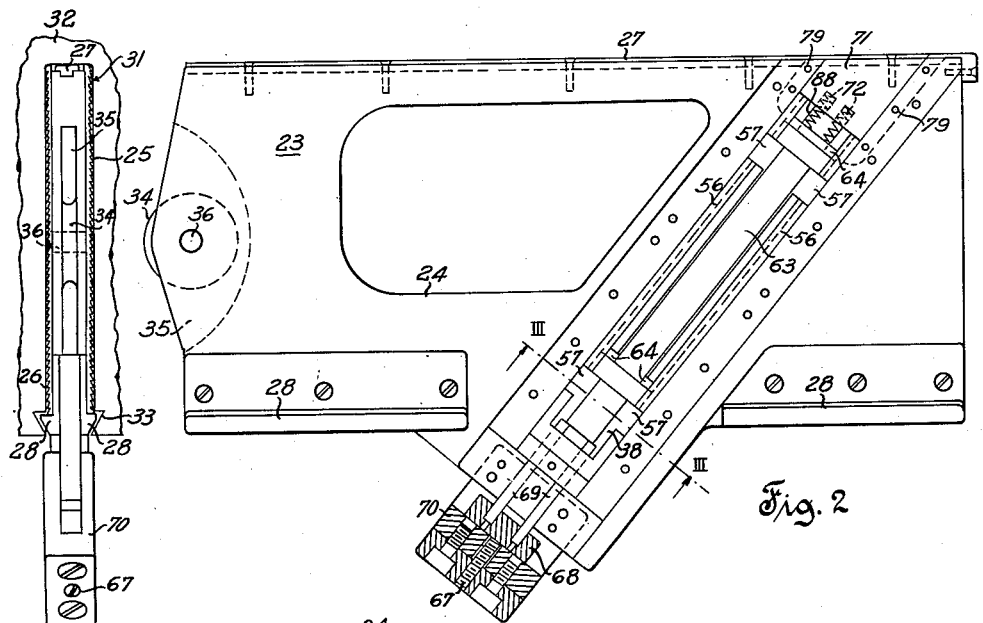
Fig. 2
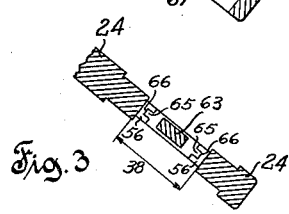
Fig. 3
Fig. 4
Inventor
Joseph Hauk
by Didier Journeaux
Attorney Dec. 23, 1952          J. HAUK          2,622,309
DEVICE FOR FILING THE SLOTS OF LAMINATED CORES
Filed May 21, 1948                    4 Sheets-Sheet 2
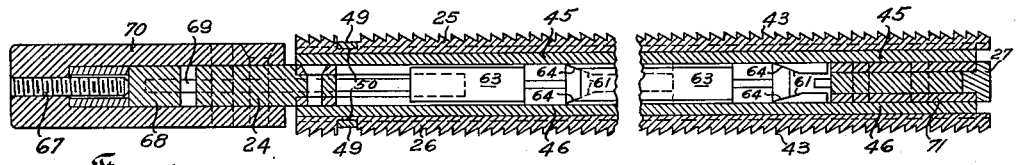
Fig. 5
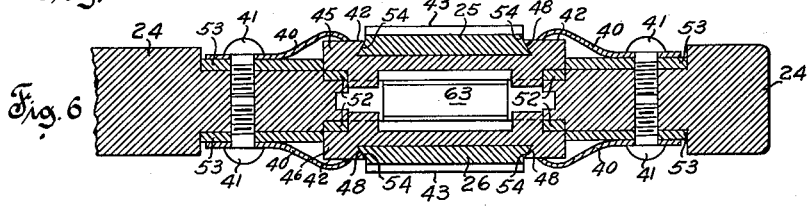
Fig. 6
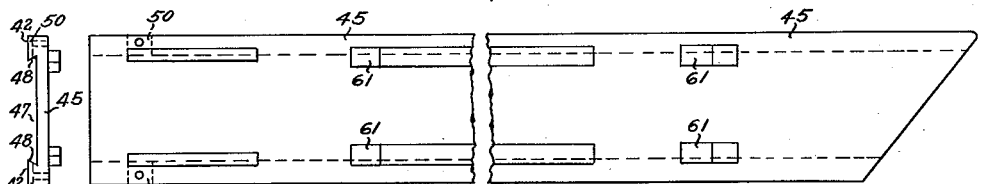
Fig. 8    Fig. 7
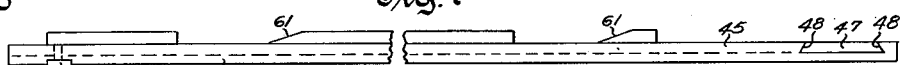
Fig. 9
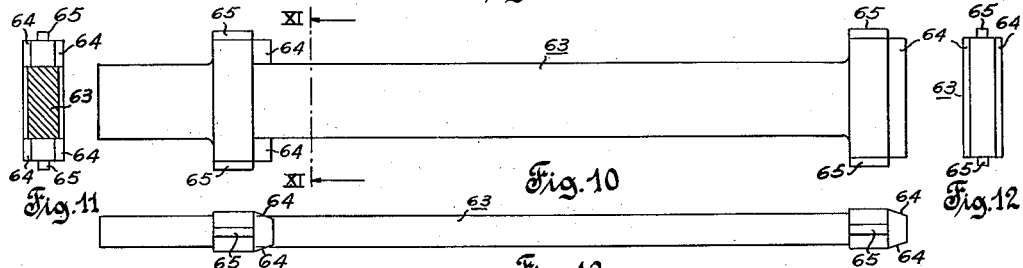
Fig. 11    Fig. 10    Fig. 12
Fig. 13
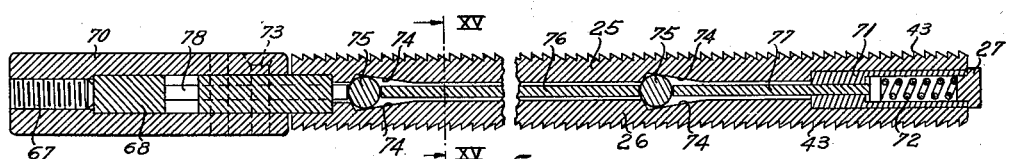
Fig. 14
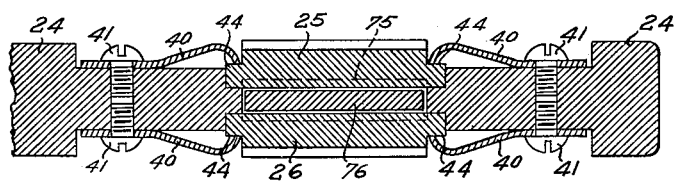
Fig. 15
Inventor
Joseph Hauk
by Didier Journeaux
Attorney Dec. 23, 1952          J. HAUK          2,622,309

DEVICE FOR FILING THE SLOTS OF LAMINATED CORES

Filed May 21, 1948          4 Sheets-Sheet 3

Inventor
Joseph Hauk
by Didier Journeaux
Attorney

Patented Dec. 23, 1952

2,622,309

UNITED STATES PATENT OFFICE 2,622,309

DEVICE FOR FILING THE SLOTS OF LAMINATED CORES

Joseph Hauk, Waukesha, Wis., assignor to Allis-Chalmers Manufacturing Company, Milwaukee, Wis., a corporation of Delaware Application May 21, 1948, Serial No. 28,323

5 Claims. (Cl. 29—78)

This invention relates in general to improvements in machine tools, and more particularly to a device for finishing the slots of laminated cores to predetermined dimensions.

Laminated cores of dynamoelectric machines and of other electrical apparatus are frequently provided with slots for the insertion of electrical conductors therein. The slotted cores are generally formed from laminations which are punched to present individual slots, the laminations being stacked with their slots in alignment. Due to manufacturing tolerances, however, the slots of the stacked laminations do not line up accurately, and a conductor which fits into a slot of an individual lamination may not fit into a slot of the assembled core. Even if the conductor could be inserted within the slot it would rest only on the edges of a portion of the laminations and therefore would be insecurely supported.

To bring the slots of the assembled core to the desired dimension and to give to the walls thereof the desired degree of smoothness, it is the general practice to hand file the slots. To reduce the time necessary and to better size the slots, it is therefore advantageous to use a device comprising suitable cutting tools such as a pair of files, which device can be moved longitudinally in each slot with the pair of files applied to opposite walls of the slot.

A preferred embodiment of the filing device comprises adjustable spacing means between a file and another member, such as another file, for applying the file and the other member against opposite walls of the slot for bringing the slot to a predetermined width. This embodiment also comprises means in a side of the device for rigidly retaining each file angularly disposed with respect to guiding means formed by the back surface of the device to cause the reaction due to the cutting operation, which is directed longitudinally of the files, to urge the device toward the bottom of the slot.

Means may be attached to the frame of the filing device for removing filings cut from the core. Such means may comprise a porous bag and a source of compressed air for blowing the filings out of the slot and into the porous bag as the filing device progresses through the slot.

It is therefore an object of the invention to provide a device for filing the slots of a laminated core, substantially reducing the time required for filing the slots.

It is another object of the invention to provide a device for filing the slots of a laminated core to remove protruding edges of laminations substantially without affecting non-protruding edges.

Another object of the invention is to provide a device for filing a slot of a laminated core to insure obtaining slots of a uniform predetermined width.

Another object of the invention is to provide a device for filing the slots of a laminated core, which device may be guided along a surface of the core.

Another object of the invention is to provide a device not requiring a fixed guide support for filing a slot of a laminated core.

Another object of the invention is to provide a device for simultaneously filing opposite walls of a slot of a laminated core.

Another object of the invention is to provide a device for filing slots of laminated cores which may be adjusted for slots of different widths.

Another object of the invention is to provide a device for filing a slot of a laminated core, which device is biased toward the core by reaction of the core against the file.

Another object of the invention is to provide a device for filing a slot of a laminated core which device provides for the removal of the filings as they are formed when the device progresses through the slot.

Other objects and advantages will be apparent from a consideration of the following description taken in connection with the accompanying drawings, in which:

Fig. 1 is a view in side elevation of a slot filing device comprising a frame, a pair of files, a pair of file holders, retaining means for holding the file holders in the frame, and adjustable spacing means for changing the spacing between the pair of files;

Fig. 2 is a view in side elevation of the slot filing device shown in Fig. 1 with the file holders and files removed;

Fig. 3 is a partial section of the device taken along the line III—III in Fig. 2;

Fig. 4 is an end view of the filing device of Fig. 1 assumed inserted in a slot;

Fig. 5 is a partial enlarged sectional view taken along the line V—V of Fig. 1;

Fig. 6 is an enlarged cross sectional view taken along the line VI—VI of Fig. 1;

Fig. 7 is a partial enlarged bottom view of the file holder shown in Fig. 1;

Fig. 8 is an end view of the file holder shown in Fig. 7;

Fig. 9 is a partial side view of the file holder shown in Fig. 7;

Fig. 10 is a plan view on an enlarged scale of the spacing member shown in Fig. 2;

Fig. 11 is a cross sectional view taken along the line XI—XI of Fig. 10;

Fig. 12 is an end view of the spacing member shown in Fig. 10;

Fig. 13 is a side view of the spacing member shown in Fig. 10;

Fig. 14 is a partial sectional view, similar to Fig. 5, of a modified slot filing device having modified spacing means acting directly between the files;

Fig. 15 is an enlarged cross sectional view taken along line XV—XV in Fig. 14;

Corresponding elements of the different embodiments shown are designated by the same characters of reference in the drawings.

Figure 16:
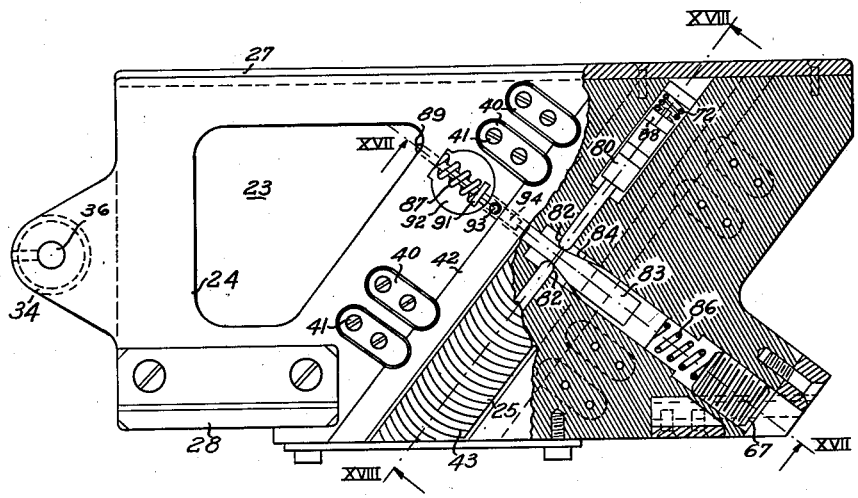
Fig. 16 is a view in side elevation of another modified slot filing device showing parts thereof broken away.

Referring more particularly to the drawings by characters of reference, numeral 23 generally designates a device for filing the slots 31 of a package of laminations 32 such as a laminated core.

The filing device comprises a plurality of members made of a suitable material such as steel, including a frame 24, at least one file 25, and retaining means for holding the file in the frame. The frame is of rectangular shape of a size and thickness determinable by the size of the slots to be filed. Fastened to the frame 24 is a guide rail 27 presenting a surface for guiding the filing device on the bottom of the slot to be filed or on some other surface of the core. Other guiding means may be attached near the front of the frame such as rib members 28, which are shaped to fit in the dovetailed portion 33 of the slot. The rib-like guide members 28 may be fastened on the frame various distances from its back to fit slots of different depths.

Any suitable means, such as a cable 37, may be attached to a connecting means located in the frame near an end of the filing device for drawing it through a slot.

The connecting means may comprise a pulley 34 fastened in a slot 35 of the frame between the sides thereof by a pin 36. The pulley affords a surface having a large radius of curvature for fastening thereto the cable 37.

In the embodiment shown in Figs. 1 to 13, a pair of files 25, 26, are contained in file holders 45, 46, disposed in channel portion 38 of the frame 24. The file holders are retained in the frame by means of clamps 40 made of a suitable material such as spring steel. The clamps 40 are fastened at one end to the frame 24 by screws 41. The other end of each clamp presses on a shoulder 42 of the file holder to keep it seated in the channel of the frame.

As shown in Fig. 8, each file holder 45 and 46 is provided with a channel 47 having inwardly inclined sides 48 for fitting bevelled sides 54 of each file. The file is slid longitudinally into place in the channel of its file holder; as is apparent in Fig. 1, it is prevented from sliding out of place by a suitable strap 49 fitted into a recess 50 extending across the file and fastened at each end to the shoulder 42 of the file holder by a screw 51.

The files may be of any grade suitable for operating on silicon steel laminations. The teeth 43 of each file may be straight, or curved as shown. The straight teeth, or the chords of the arcs formed by the curved teeth, are transverse to the file length, so that the surface component of the reaction of the core to the pressure of the file teeth is directed longitudinally on the file.

The pair of files 25, 26, are disposed in opposite sides of the frame 24 with the teeth of one file parallel with the teeth of the other file. The teeth of the files protrude out of the sides of the filing device.

Each file is angularly disposed in the frame 24 with respect to the guide rail 27 forming the back surface of the filing device. The files 25, 26, may extend to the guide surface of the guide rail 27, and the end of the file may form a part of the guide surface of the filing device. Each file may have teeth continuing to the end of the file adjacent the guide rail for filing the walls of the slot to the bottom thereof.

The files may also extend just short of the guide rail 27 so that the ends of the files do not ride on the bottom of the slot. Each tooth of each file simultaneously contacts several laminations resulting in even cutting action over an extended portion of the walls of the slot as the filing device progresses through the slot.

To provide adjustable spacing means for changing the spacing between the pair of files, each file holder 45, 46, has two sets of inclined surfaces 61 as shown in Figs. 7 and 9. These surfaces are all inclined at the same angle. Between the pair of file holders is disposed a spacing member 63 having inclined surfaces 64 or wedges which correspond to the inclined surfaces 61 of the file holders. The spacing member 63 has projections 65 fitted to longitudinal grooves 66 of frame 24 for slidably supporting the spacing member therein. The channel portion 38 has side rails 56 which define the grooves 66. Each of the rails 56 presents two gaps 57 to permit inserting projections 65 in the grooves 66.

Means are provided for moving the spacing member longitudinally comprising a setting screw 67, a sliding block 68, and a pair of pins 69. Screw 67 is inserted in a fixed block 70 bridging the outer end of channel 38. Turning the setting screw 67 to move inwardly causes the block 68 to press the pins 69 against the spacing member 63 and move it forward in grooves 66 away from the setting screw. Movement of the spacing member 63 forward causes its inclined surfaces 64 to slide on the corresponding inclined surfaces 61 of the file holders. The file holders 45, 46 are forced further from the spacing member 63 as the spacing member is moved forward. Thus the spacing between one file holder 45 and the other file holder 46, as well as between the files 25, 26 contained therein, increases when the setting screw is moved inwardly.

Bias springs 72 act between the end of the spacing member 63 opposite from the setting screw and a second block 71 bridging the inner end of channel 38 between file holders 45, 46. The bias springs 72 are compressed by forward movement of the spacing member 63.

When the setting screw is turned for backward movement, the bias springs 72 push the spacing member 63 back toward the setting screw, and the retaining clamps 40 press the file holders together to maintain them properly seated in the filing device.

In assembling the filing device 23, block 70 is rigidly fastened by screws 73 to the front of frame 24, with the pins 69 projecting into the outer end of channel 38. At the other end of the channel, block 71 is inserted in the frame and fastened by screws 79. Spring 72 presses a piston 88 toward the channel for biasing the spacing member toward the setting screw.

The spacing member 63 is inserted in channel 38 with projections 65 of the spacing member fitting into the gaps 57 of the side rails 56. By adjusting setting screw 67, the spacing member is slidably moved in channel 38 toward biasing springs 72, whereby projections 65 are introduced into grooves 66 to retain the spacing member in the channel.

Guide rail 27 is attached to the back of the frame, and the rib-like guide members 28 are attached on the right and left sides near the front of the frame for fitting in a dovetailed groove of the slot to be filed.

Files 25, 26 are slidably inserted in their respective file holders 45, 46, and straps 49 are fastened in place, keeping the files from sliding out of their holders.

Each file holder containing a file may then be seated on rails 56 in channel 38 of the frame and held in place by means of clamps 40. Setting screw 67 is turned to adjust the spacing between the pair of files 25, 26. The spacing between the files is adjusted so that the device may file the walls of a slot to bring the slot to a uniform predetermined width.

Cable 37 is attached to pulley 34 for pulling the device through the slot. The spacing of the files is adjusted by the setting screw. The spacing is such that the pair of files will be applied against opposite walls of the slot for cutting the slots to the predetermined dimension. The filings or chips produced by the cutting action move out from between the teeth in a line substantially parallel to the line of movement of the filing device when files 25, 26, having curved teeth, are used.

The cable end of the device is inserted in the slot from an end thereof, and the filing device pulled through the slot in one direction. The reaction of the core to the teeth of the files inclined to the bottom of the slot is directed longitudinally on the files to bias the device to the bottom of the slot and cause the guide rail 27 to ride on the bottom of the slot. Any duct opening into the slot of the core being filed is bridged by the guiding means.

Figures 20, 22:
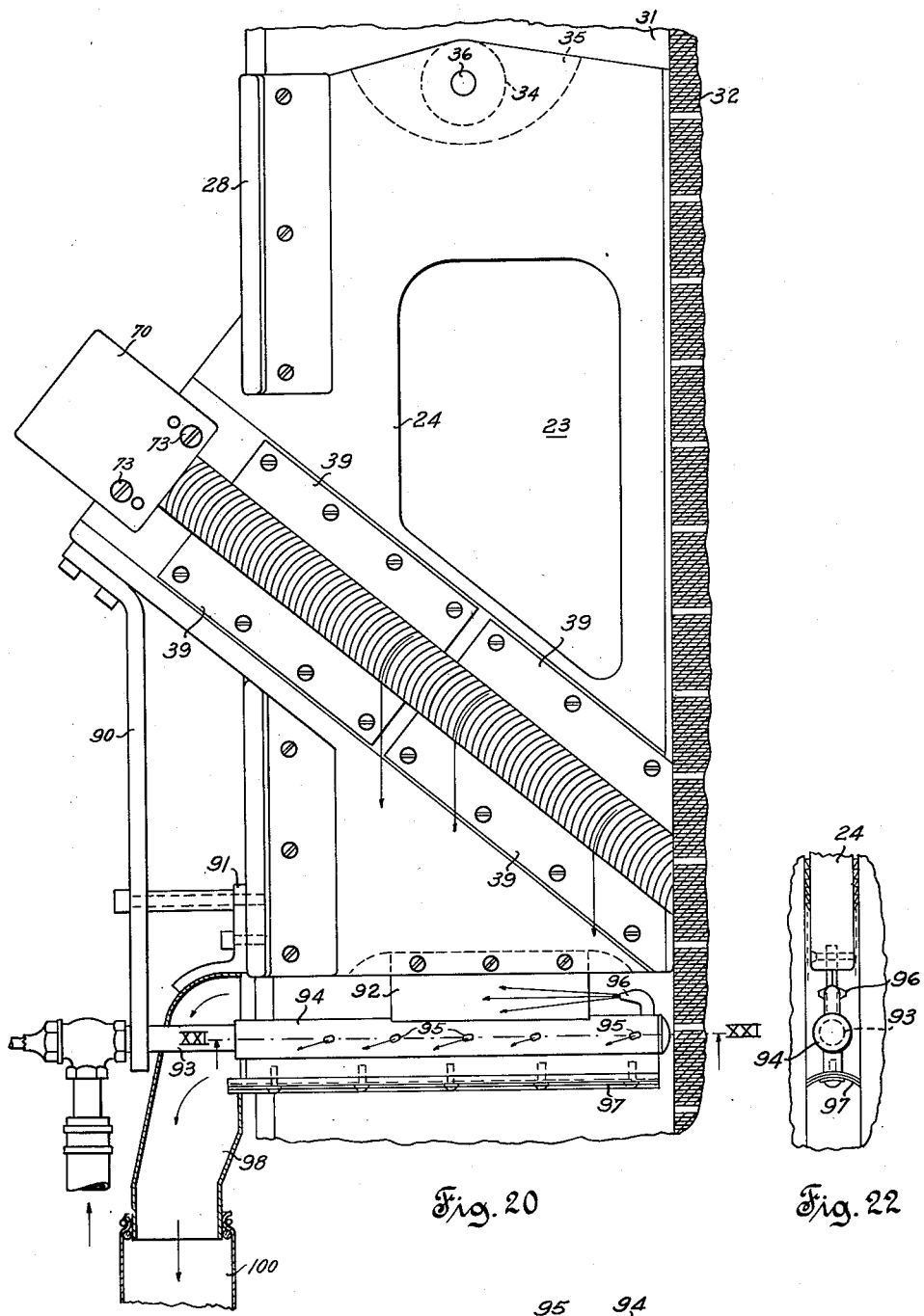
Fig. 20 is a view in elevation of a further slot filing device having an attached means for removing filings formed by the filing device comprising an air nozzle and a barrier.
Fig. 22 is an end view of the nozzle and barrier shown in Fig. 20 as in place in a slot.
Figure 21:
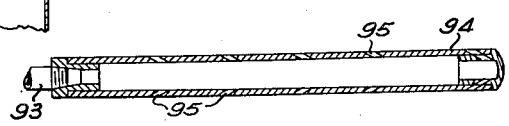
Fig. 21 is a longitudinal sectional view of the air nozzle taken along the line XXI—XXI in Fig. 20.

As shown in Fig. 20, means for collecting filings removed from the core may be attached to the frame of the filing device by brackets 90, 91, 92. The filing collecting means may comprise a pipe 93 having a portion 94 aligned with the trailing end of the frame 24. This portion has a series of nozzle openings 95 and a nozzle 96 near the end of pipe 93 to be adjacent the bottom of the slot. Attached to the portion 94 of pipe 93 is a flexible barrier 97 to confine the portion of pipe having nozzle openings between the filing device, the barrier, and the walls of the slot. Also attached to the frame and to the barrier is a large air duct 98 having an opening to the confined space of the slot between the filing device and the barrier. This air duct supports at its other end a porous bag 100.

Compressed air supplied to the pipe 93 escapes through the nozzle openings 95 and nozzle 96 constructed to direct the flow of air about the portion of the pipe and toward the air duct 98 to the porous bag 100.

As the filing device is drawn through a slot, the filings formed by the cutting tool are confined by the barrier and the walls of the slot and are blown by the escaping air toward the air duct and into the porous bag 100.

The files may be spaced apart a minimum distance when each file holder 45, 46, is seated in a channel 38 of the frame with the shims 52, 53 removed. To vary the spacing of the files, shim inserts 52 of a suitable thickness may be used between each file holder and the channel of the frame, as shown in Fig. 6. The retaining clamps 40 for the file holders may likewise be raised or lowered by shims 53, as also shown in Fig. 6.

As shown in Figs. 14 and 15, the files may be seated directly in the channel of the frame without employing file holders, but retaining the files by clamps 40 pressing on lip or shoulder surfaces 44 of each file.

Fig. 14 also shows a modification of adjustable spacing means. The files have inclined surfaces on the bottom side of each, as file holders are not employed. These inclined surfaces 74 are recessed in each file. The spacing means comprises at least two sets of rollers 75 seated in the bottom of the recessed inclined surfaces, spacing bars 76, 77, and a plunger 78. The plunger is moved forward by adjustment of the setting screw 67 and pushes a first roller 75 which in turn pushes the spacing bar 76, the second roller 75, and the second spacing bar 77 compressing biasing springs 72. Such forward movement of the rollers against inclined surfaces 74 forces an increase in the spacing between the pair of files 25, 26. The files remain uniformly spaced throughout their length. Biasing springs 72 force the rollers into the bottom of the recesses formed by the inclined surfaces 74, when the setting screw is turned back.

The spacing means described as shown in Fig. 14 may also be used with a filing device employing file holders. The bottom of the file holders would have recessed inclined surfaces 74 for use with the rollers 75. The retaining means may comprise plates 39 as shown in Fig. 20, instead of clamps 40.

Figure 17:
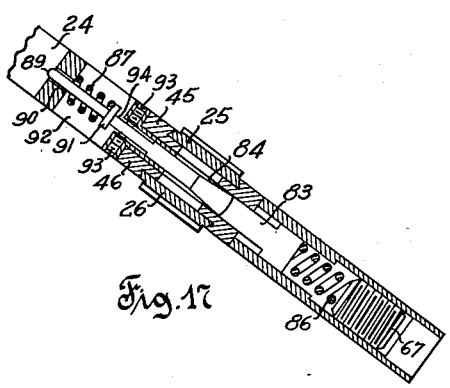
Fig. 17 is a sectional view taken along the line XVII—XVII of Fig. 16.
Figure 18:
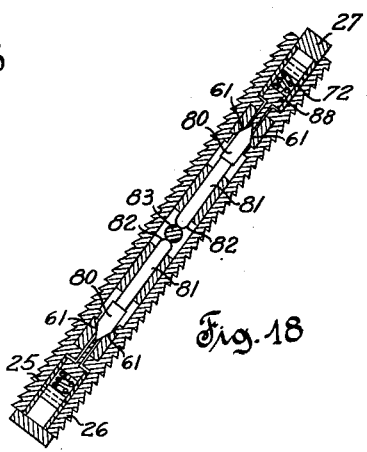
Fig. 18 is a sectional view taken along the line XVIII—XVIII of Fig. 6.
Figure 19:
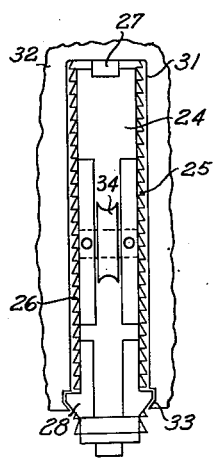
Fig. 19 is an end view of the slot filing device of Fig. 16 assumed inserted in a slot.

The filing device may also have a spacing means as shown in Figs. 16 to 18. On the bottom of each file holder are two sets of oppositely inclined surfaces 61. Located between each corresponding set of inclined surfaces on opposite file holders is a wedge 80 contacting the inclined surfaces 61 of the file holders and ending in a pin 81 having a rounded or ball shaped end and extending to a plunger 83.

Means for resiliently adjusting the separation of the wedges comprise the plunger 83, and the setting screw 67. The plunger is partly cylindrical in shape and has a portion 84 tapering toward the ends of pins 81 of the wedges and disposed between the pins. The plunger extends beyond its tapered portion to a rod portion 89 projecting out of a drilled hole 90 in the frame.

A spring 87 is mounted on the rod portion of the plunger extending through an opening 92 in the frame. The spring 87 acts between a collar or washer resting against a shoulder of plunger 83 and a wall of the opening 92 in the frame. A pair of set screws 93 lightly touch flat surfaces 94 on the plunger between the collar 91 and the tapered portion 84 for preventing rotation of the plunger. A spring 86 acts between the plunger 83 and the setting screw 67 for forward bias of the plunger. Spring 87 is for return bias of the plunger 83.

Forward movement of plunger 83 brings the tapered portion 84 of increasing width between the pins 81 of the wedges. The tapered portion of the plunger makes sliding contact with the pins, forcing the pins farther apart as the plunger moves forward.

The pins 81 move longitudinally in slots 85 to cause the wedges 80 to slide on the sets of inclined surfaces 61. Thus the wedges cooperate with the inclined surfaces to increase the spacing between the files.

When the wedges are withdrawn toward one another due to the biasing action of springs 72, the clamps 46 retaining the file holders press the holders toward each other, keeping them seated in the frame. The piston 88 is V notched for cooperating with the wedges 80.

Although but a few embodiments of the present invention have been illustrated and described, it will be apparent to one skilled in the art that various changes and modifications may be made therein without departing from the spirit of the invention or from the scope of the appended claims.

It is claimed and desired to secure by Letters Patent:

1. A device for filing a slot of a laminated core comprising a pair of files, the general direction of the teeth of said files being perpendicular to the length of said files, a frame, means mounted on said frame defining a guiding surface for guiding said device on a surface of said core, retaining means mounted on said frame for holding said files parallel to each other on opposite faces of said frame whereby the teeth of said files are substantially parallel, common adjustable spacing means mounted on said frame and acting between said files for maintaining a fixed distance between all points of said files engaging opposite sides of said slot, said files being disposed in said frame at an angle with respect to said guiding surface with the leading portions of said teeth closest to said guiding surface to cause said device to be biased by the surface component of the reaction of the sides of said slot on said teeth to apply said guiding surface against said core when said device progresses through said slot.

2. A device for filing a rectangular slot of a laminated core, said device comprising at least one file, said file having teeth in the form of linear ridges whereby movement of said file in contact with an object causes said object to exert on said file a reaction substantially perpendicular to said teeth, a frame, means mounted on said frame defining a guiding surface for guiding said device on a surface of said core, retaining means mounted on said frame for rigidly holding said file in one of the faces of said frame and parallel to another face of said frame, said faces of said frame and the edges of said teeth lying in surfaces different from said guiding surface, said file being so disposed in said frame with the teeth of said file inclined with respect to said guiding surface that each of said teeth has its end on the leading side of said file closer to said guiding surface than its end on the trailing side of said file to cause said device to be biased by the surface component of the reaction of a side of said slot on said teeth to apply said guiding surface against said core when said device progresses through said slot.

3. A device for filing a rectangular slot of a laminated core, said device comprising at least one file having ridge shaped teeth, the general direction of all the teeth of said file being perpendicular to the length of said file, a frame, means mounted on said frame defining a guiding surface for guiding said device on a surface of said core, retaining means mounted on said frame for holding said file in one of the faces of said frame and parallel to another face of said frame, said faces of said frame and the edges of said teeth lying in surfaces different from said guiding surface, said file being so disposed in said frame at an angle with respect to said guiding surface that each of said teeth has its end on the leading side of said file closer to said guiding surface than its end on the trailing side of said file to cause said device to be biased by the surface component of the reaction of a side of the slot on said teeth to apply said guiding surface against said core when said device progresses through said slot.

4. A device for filing a rectangular slot of a laminated core, said device comprising a pair of files, each of said files having teeth in the form of linear ridges whereby movement of one of said files in contact with an object causes said object to exert on said one of said files a reaction substantially perpendicular to said teeth, a frame, means mounted on said frame defining a guiding surface for guiding said device on a surface of said core, retaining means mounted on said frame for rigidly holding said files parallel to each other on opposite faces of said frame with the teeth of said files substantially parallel and with the edges of said teeth lying in two surfaces different from said guiding surface, said files being so disposed in said frame with the teeth of said files inclined with respect to said guiding surface that each of said teeth has its end on the leading side of said files closer to said guiding surface than its end on the trailing side of said files to cause said device to be biased by the surface component of the reaction of the sides of said slot on said teeth to apply said guiding surface against said core when said device progresses through said slot.

5. A device for filing a rectangular slot of a laminated core, said device comprising a pair of files having ridge shaped teeth, the general direction of all the teeth of said files being perpendicular to the length of said files, a frame, means mounted on said frame defining a guiding surface for guiding said device on a surface of said core, retaining means mounted on said frame for holding said files parallel to each other on opposite faces of said frame with the teeth of said files substantially parallel and with the edges of said teeth in two surfaces different from said guiding surface, said files being so disposed in said frame at an angle with respect to said guiding surface that each of said teeth has its end on the leading side of said files closer to said guiding surface than its end on the trailing side of said files to cause said device to be biased by the surface component of the reaction of the sides of said slot on said teeth to apply said guiding surface against said core when said device progresses through said slot.

JOSEPH HAUK.

REFERENCES CITED

The following references are of record in the file of this patent:

UNITED STATES PATENTS

| Number | Name | Date |
| --- | --- | --- |
| 1,031,637 | Fischer | July 2, 1912 |
| 1,041,240 | Chappell | Oct. 15, 1912 |
| 1,160,452 | Sargent | Nov. 16, 1915 |
| 1,876,468 | Quigley | Sept. 6, 1932 |
| 1,939,038 | Bower et al. | Dec. 12, 1933 |
| 2,205,979 | Horechney | June 25, 1940 |